United States Patent
Okada et al.

[11] Patent Number: 6,144,188
[45] Date of Patent: Nov. 7, 2000

[54] METHOD FOR DETECTING FULLY CHARGED CONDITION OF SECONDARY BATTERY AND DETECTOR USING THE SAME

[75] Inventors: Yukihiro Okada, Katano; Hiromu Matsuda, Hyogo; Yoshinori Toyoguchi, Yao; Yoshinori Yamada, Tondabayashi, all of Japan

[73] Assignee: Matsushita Electric Industrial Co., Ltd., Osaka-fu, Japan

[21] Appl. No.: 09/304,689

[22] Filed: May 4, 1999

[30] Foreign Application Priority Data

May 11, 1998 [JP] Japan ................................. 10-127133

[51] Int. Cl.[7] ........................................................ H02J 7/04

[52] U.S. Cl. ............................................ 320/141; 320/139

[58] Field of Search ................................... 320/141, 139, 320/129, 136

[56] References Cited

U.S. PATENT DOCUMENTS

| | | | |
|---|---|---|---|
| 5,159,272 | 10/1992 | Rao et al. | 320/136 |
| 5,345,162 | 9/1994 | Shiojima | 320/164 |
| 5,576,608 | 11/1996 | Nagai et al. | 320/159 |

*Primary Examiner*—Peter S. Wong
*Assistant Examiner*—Lawrence Luk
*Attorney, Agent, or Firm*—Akin, Gump, Strauss, Hauer & Feld, L.L.P.

[57] ABSTRACT

The present invention provides a method for detecting a fully charged condition of a secondary battery by which the fully charged condition of a secondary battery can be detected accurately and deterioration in battery characteristic due to overcharging can be restrained irrespective of the charging mode and the surroundings, without the need for a special battery structure. In the method, pulse vibrations generated inside a secondary battery being charged are detected, and when the obtained characteristic value of the pulse vibrations, for example, incidence of generation of the vibrations reaches a predetermined value, the secondary battery is determined to be in fully charged condition.

13 Claims, 6 Drawing Sheets

METHOD FOR DETECTING FULLY CHARGED CONDITION OF SECONDARY BATTERY AND DETECTOR USING THE SAME

BACKGROUND OF THE INVENTION

The present invention relates to a method for detecting a fully charged condition of a secondary battery and the fully charged condition detector.

Presently, portable apparatuses that operate on small-sized high-capacity secondary batteries such as notebook-type personal computers and portable telephones are rapidly becoming widespread. Moreover, electric vehicles that move on large-capacity secondary batteries have been put to practical use.

In the use of these secondary batteries, overcharge should be prevented since it is a serious factor that causes shortenings of the battery cycle life. Moreover, shortening the charging time by accurately detecting the fully charged condition of the secondary battery is desirable for users' convenience.

Conventionally, apparatuses using secondary batteries and battery chargers have been provided with means for preventing overcharge by detecting the fully charged condition of secondary battery under charging.

In most of these methods, a voltage, temperature or internal pressure of the battery is measured and the measurement value is compared with a predetermined value to control charging.

Concrete examples will hereinafter be described.

Japanese Laid-open Patent Publication No. Hei 6-133468 proposes a charging method in which during charging of a nickel-metal hydride storage battery, the fully charged condition is detected based on a temperature, internal pressure and voltage of the battery and the charging mode is changed to trickle charge after the battery is detected to be fully charged.

Japanese Laid-open Patent Publication No. Hei 7-240236 proposes a charging control method in which an apparatus (or a battery charger) charges a battery at a gradually increasing charging voltage, and detects an overvoltage of the battery if the battery is loaded for the first time, and from the next time, it charges the battery at a constant charging voltage of the overvoltage value detected in the initial charging.

Japanese Laid-open Patent Publication No. Hei 8-70537 proposes a method in which a terminal voltage change amount $\Delta V$ and a temperature change amount $\Delta T$ of a battery being charged are detected with a predetermined interval, and the battery is judged to reach a fully charged condition when $\Delta V$ tends to decrease and $\Delta T$ tends to increase.

Japanese Laid-open Patent Publication No. Hei 7-240234 proposes a charging method in which, while the voltage of a battery under charging being detected periodically and a change amount in the battery voltage from the value in the last measurement being calculated, a charging current is reduced or charging itself is finished when the difference between the change amount and the maximum value of the change amounts calculated in the last cycles becomes equal to or higher than a preset value.

Japanese Laid-open Patent Publication No. Hei 7-27256 proposes a charging control responsive to a change in charging current.

According to this prior art, there is added to an apparatus a function to limit an output current flowing to an external power source, which monitors the charging current per unit time even when the secondary battery is charged while the apparatus is operating, thereby changing the detection value of the battery temperature increase per unit time and calculating a limitation value of charged amount of the battery.

The fully charged condition detection based on the voltage, temperature or internal pressure of the battery as described above have the following problems.

In the detection based on the battery voltage, when the temperature of the battery increases, voltage changes in the last stage of the charging are difficult to catch, so that an accurate detection of the battery's condition is difficult.

In the detection based on the internal pressure, there is required a special structure for the battery to provide a sensor for detecting the internal pressure inside the battery.

The detection based on the battery temperature is low in response to a condition change, since the detection depends on the heat transmission velocity in the battery. Therefore, this method is not suitable for practical use in a battery system where switching between charging and discharging is made in a short time. Further, it is affected by the environmental temperature of the battery.

As a charging method that requires no measurement of the voltage, temperature or internal pressure of the battery to detect whether the battery is fully charged, Japanese Laid-open Patent Publication No. Hei 7-85892 proposes a charging method in which, while measuring acoustic emission signals (hereinafter, referred to as "AE signals") from the battery by using a root mean square circuit (hereinafter, referred to as "RMS circuit"), the charging mode is changed from constant-current charging to constant-voltage charging when the differentiation value of the measurement tends to sharply increase.

In this method, since a change before and after the battery is fully charged is detected, the change is comparatively easy to detect in a system where charging is continuously performed. However, in a case of repeating pulse-like charging, it is difficult to find a point where the change occurs. In addition, when a fully-charged battery is further charged, it is impossible to detect that the battery is overcharged.

BRIEF SUMMARY OF THE INVENTION

An object of the present invention is to solve the above-mentioned conventional problems. The present invention provides a method for detecting fully charged condition of a secondary battery by which a fully charged condition of the secondary battery can be accurately detected and deterioration in battery characteristic due to overcharging can be restrained irrespective of the charging mode and the surroundings and without the need for a special battery structure.

According to a method for detecting a fully charged condition of a secondary battery of the present invention, while detecting pulse vibrations generated inside a secondary battery under charging, the secondary battery is detected to be in a fully charged condition when the obtained characteristic value of the pulse vibrations reaches a predetermined value.

When it is determined that the battery is in fully charged condition, at that point of time, charging is finished or the charging condition thereafter is changed as required. For example, in constant-current charging, the charging current value is reduced. Alternatively, the charging mode is switched from constant-current charging to constant-voltage charging, if necessary.

The present invention focuses attention on the fact that in the case of secondary batteries with an aqueous electrolyte such as lead-acid storage batteries, nickel-cadmium storage batteries and nickel-metal hydride storage batteries, an internal pressure increases and pulse vibrations, that is, so-called acoustic emission signals (hereinafter, referred to as "AE signals") are generated from the inside of the battery in the last stage of charging.

Since the pulse vibrations are generated without exception in the last stage of charging, the fully charged condition detection based on the pulse vibrations is less affected by the environmental temperature, etc. than the conventional detection based on a temperature change or voltage change of the battery.

The method of detecting fully charged condition of the secondary battery can detect whether the battery is fully charged even when a battery having already been fully charged is further charged, since the charging condition of the battery can directly be detected from the amount of a gas generated in the battery. Further, this method is applicable to any charging mode such as pulse charge.

The characteristic value of the pulse vibrations used here includes an incidence of generation of pulse vibrations, that is, the count number within a unit time, and the average value of intensities of the pulse vibrations within a unit time.

In particular, by using the incidence of generation of the pulse vibrations, the error caused by noise can be reduced. The method with counting the vibrations is less susceptible to the influence of noise than the method with counting the integration value of the vibration signals by an RSM circuit.

The present invention is not limited to the method in which the characteristic value directly obtained within a unit time is used every unit time. The fully charged condition can also be detected based on the with-time change, that is, the integration value, the differentiation value or the increase amount of the characteristic value.

Since the incidence of generation of the pulse vibrations continuously changes during a period from the last stage of charging to overcharging, it is effective to use an average value of the characteristic values obtained over a plurality of unit times instead of each characteristic value within the unit time, to level the measurement data whereby to reduce the influence of the noise unexpectedly mixed in the signal.

By extracting with priority the components having frequencies in a range of 1 kHz to 500 kHz from the detected pulse vibrations, the noise can effectively be removed. Since the AE signals are ultrasonic waves, the vibrations in the frequency regions other than the above frequency region are regarded as noise and are removed, whereby the pulse vibrations can be detected with accuracy.

In order to extract with priority the components of a specific frequency region from the observed signals, for example, the vibrations in the battery is detected by a piezoelectric element whose resonance frequency is included in the frequency region, which is highly sensitive to the vibrations in the frequency region.

When vibration detecting means for converting the detected vibrations into electric signals is used, the components of the output signal that are in a similar frequency region to the above-mentioned one are filtered and extracted by using, for example, a bandpass filter.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In the following paragraphs, preferred examples of the present invention will be described with referred to the attached drawings.

EXAMPLE 1

In this embodiment, an example of a method in which the fully charged condition of a battery is detected based on a number of pulse vibrations generated in the battery during charging will be described.

Figure 1:
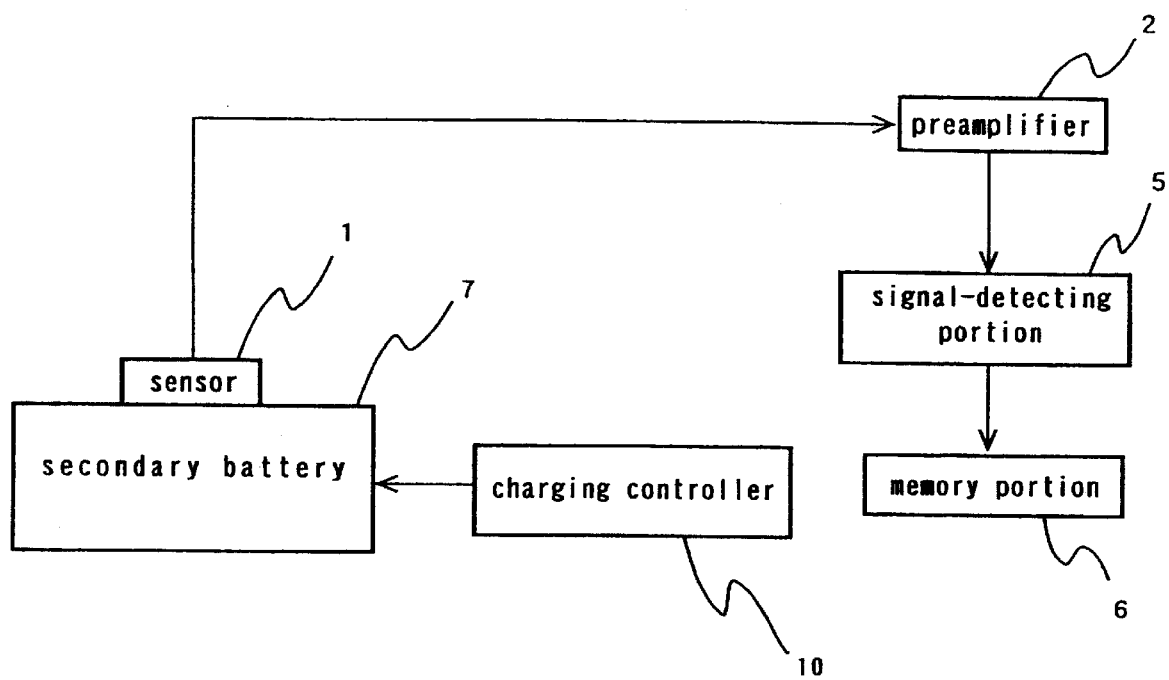
FIG. 1 is a block diagram showing a structure of a fully charged condition detector used in an embodiment of the present invention.

A secondary battery was charged by using an apparatus shown in FIG. 1. As a secondary battery 7, a sealed nickel-metal hydride storage battery with a nominal capacity of 6.5 Ah was used. Onto a wall of the secondary battery 7, a vibration detecting sensor 1 having a piezoelectric element (manufactured by NF corporation: model No. AE-901S) using a lead-zirconium titanate ceramic is crimped. The resonance frequency of the sensor 1 is 140 kHz. The sensor 1 outputs an electric signal responsive to the detected vibrations in the secondary battery 7. The output signal of the sensor 1 is amplified by a preamplifier 2 (manufactured by NF corporation: model No. 9913) and is then input to a signal-detecting portion 5.

The signal-detecting portion 5 detects a component of the input signal that has an intensity not less than a threshold value, and calculates the incidence of occurrence of the component within a predetermined period of time. The result of the calculation is recorded in a memory portion 6.

Figure 2A:
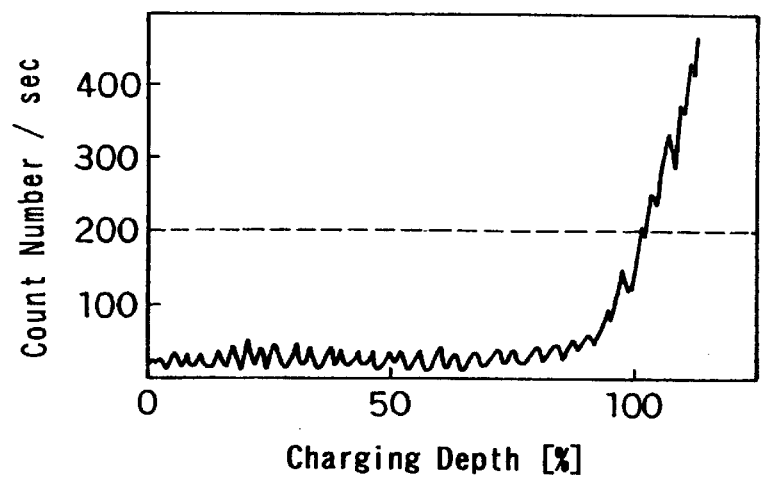
FIG. 2A shows a characteristic diagram showing a change in count number of pulse vibrations generated in a secondary battery at charging.
Figure 2B:
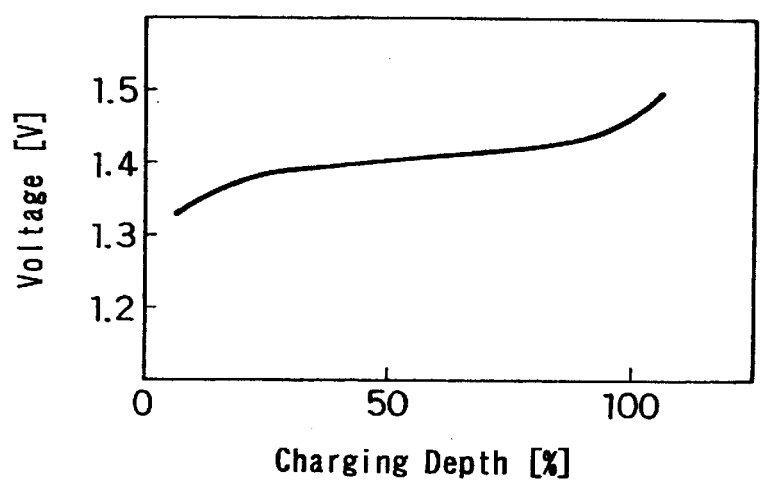
FIG. 2B shows a characteristic diagram showing a change in voltage of the secondary battery at charging.
Figure 2C:
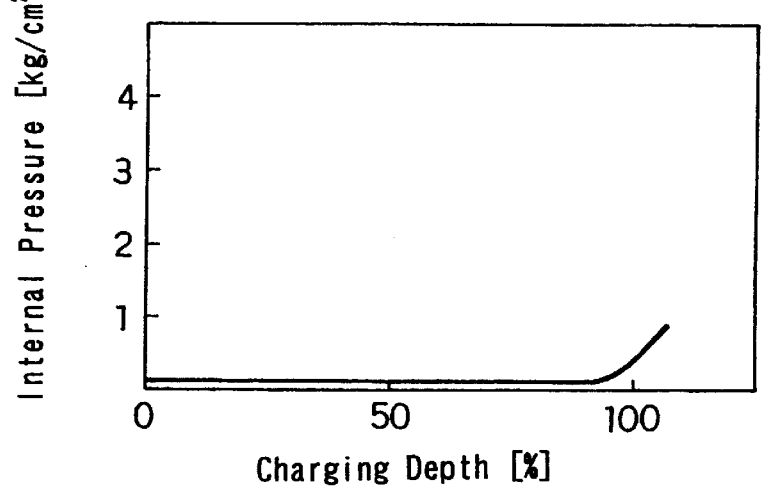
FIG. 2C shows a change in internal pressure of the secondary battery under charging.

A constant current of 6.5 A was supplied from a charging controller 10 to the secondary battery 7 at an environmental temperature of 25° C., and the secondary battery 7 was charged to 105% of the nominal capacity. FIG. 2A shows a change in the number of pulse vibrations (hereinafter, referred to as "count number") which the signal-detecting portion 5 counted for one second during charging. FIG. 2B and FIG. 2C show a change in battery voltage and that in internal pressure at that time, respectively.

When the battery is brought into the last stage of charging, the internal pressure of the battery begins to increase as shown in FIG. 2C and at the same time, the count number also begins to increase as shown in FIG. 2A. The count number sharply increases when the charging depth of the battery exceeds 100% of the nominal capacity.

Generally, in a battery using an aqueous electrolyte, when the battery is overcharged, water in the electrolyte is electrolyzed to generate gasses. Therefore, it is considered that the observed pulse vibrations are AE signals generated when bubbles of an oxygen gas and hydrogen gas are generated by the electrolysis of water, when the generated bubbles reach the top surface of the electrolyte and burst and when a plurality of bubbles are integrated into a new bubble.

It is apparent from the above comparison that the fully charged condition of a battery can be detected by judging that the battery reaches a fully charged state when the count number exceeds a predetermined threshold value. For example, in FIG. 2A, it can be determined that the battery is fully charged when the count number becomes 200 per second.

Figure 3:
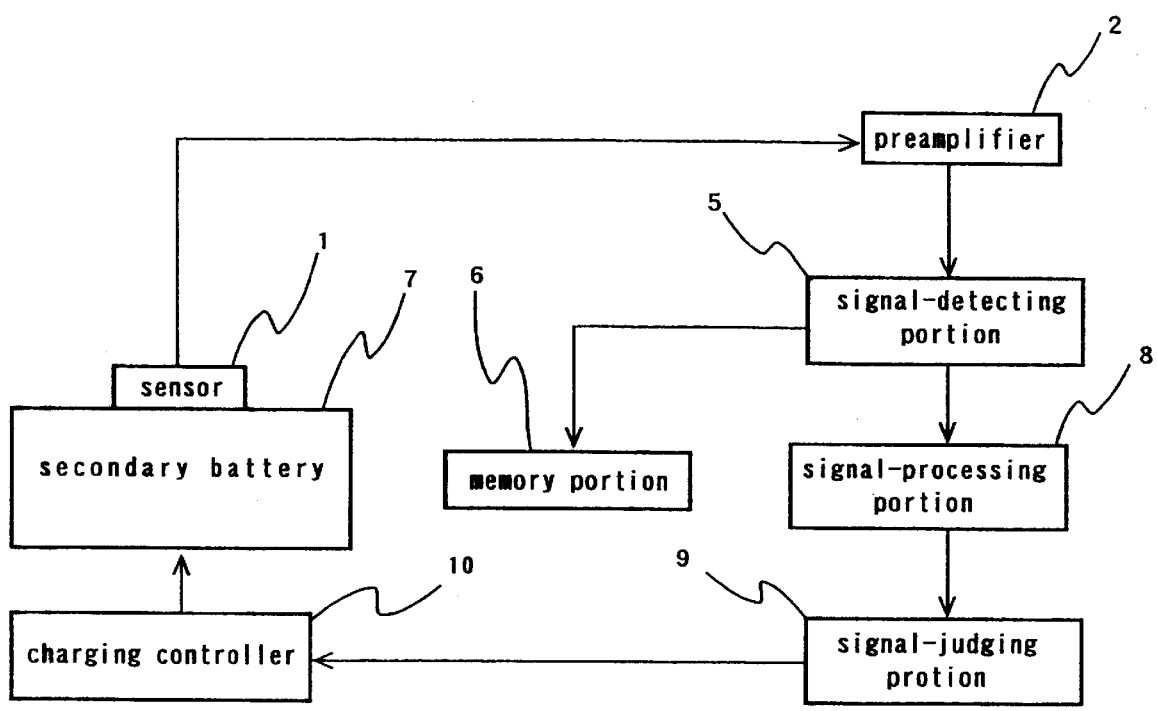
FIG. 3 is a block diagram showing a structure of a battery charger used in one embodiment of the present invention.

Therefore, for example, by using a battery charger shown in FIG. 3, the charging of a secondary battery can be controlled with high accuracy. The battery charger is a combination of the fully charged condition detector shown in FIG. 1 and a conventional battery charger.

The signal-detecting portion 5 outputs a signal associated with the obtained count number to the memory portion 6 and to a signal-processing portion 8.

The signal-processing portion 8 calculates the change amount of the count number based on the signal from the signal-detecting portion 5. The information calculated by the signal-processing portion 8 is output to a signal-judging portion 9. The signal-judging portion 9 determines whether to change the charging condition of the secondary battery 7 based on the information from the signal-processing portion 8. When the signal-judging portion 9 judges that the charging condition should be changed, it determines the new charging condition. For example, when the count number reaches 200 per second as mentioned above, charging is stopped or the charging current value is re-set to a lower value. After the determination, the signal-judging portion 9 changes the charging condition of the battery 7 by operating a charging controller 10.

An influence of noise can be minimized by counting the pulse signal as described above.

In a method where the determination is performed based on an intensity of the signal by using an RMS circuit, the intensity of the noise mixed in the signal directly affects the calculation value. On the contrary, in the method of this embodiment, that is, the method where the number of pulse signals is counted, the noise mixed in the signal is recognized as merely one pulse signal.

Figure 4:
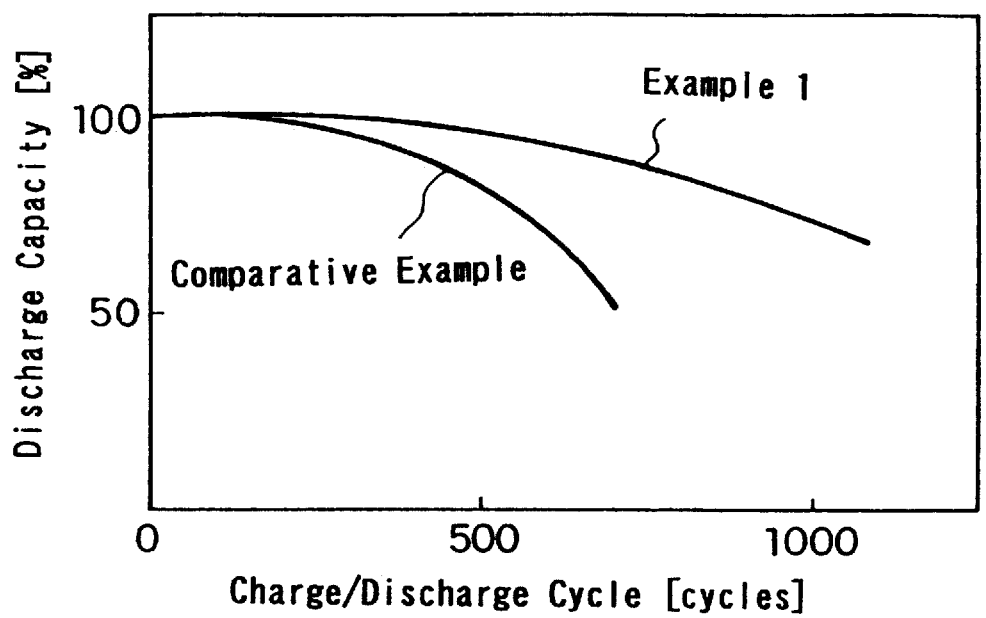
FIG. 4 is a characteristic diagram showing a cycle characteristic of a battery embodying the fully charged condition detecting method of the same embodiment.

With the above-described battery charger, the cycle characteristic of the discharging capacity of a battery was actually checked by repeating charging and discharging of the battery. FIG. 4 shows the result. The charging and discharging were both performed in an atmosphere of 40° C. The battery was charged at a constant current of 6.5 A, and discharged at a constant current of 6.5 A until the battery voltage drops to 0.9 V.

As a comparative example, a conventional fully charged condition detecting method in which charging is stopped when the voltage change amount $\Delta V$ becomes negative was also evaluated. The result is also shown in FIG. 4.

As shown in FIG. 4, the cycle characteristic of the battery embodying the fully charged condition detecting method of this embodiment is superior to that of the battery embodying the conventional as a comparative example.

Next, a relationship between the charging current value and the count number will be described.

Figure 5:
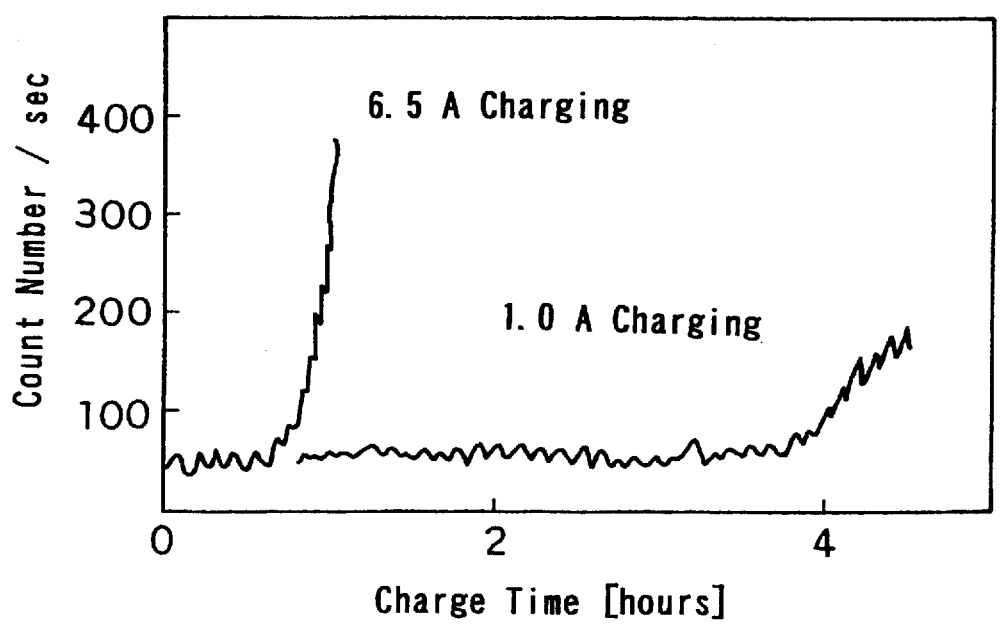
FIG. 5 is a characteristic diagram showing a behavior of the count numbers of the pulse vibrations generated in the secondary battery under charging at different rates.

FIG. 5 shows the count numbers of pulse vibrations when the charging current values are constant values of 1.0 A and 6.5 A at 50° C.

In either case, the count number is small and substantially invariant for some time after the start of the charging. It can be judged that the signals detected at this time are noises (signals due to a factor other than a gas generation).

The count number sharply increases after approximately 40 minutes from the start of charging in the 6.5 A current charging and after approximately four hours in the 1.0 A current charging. It can be considered that the gas generations are started at these points, respectively.

The subsequent change in the count number differs according to the charging rate. That is, the change is based on the incidence of the gas generation per unit time. In the case where the same threshold value is used for different charging current values, a longer time is required for the count number to reach the threshold value when a low charging current is used. However, there is not a large difference in overcharging amount between different charging rates. To more accurately determine that the battery is fully charged, it is desirable to make a correlation between the threshold value and the charging rate.

Moreover, when the threshold value is fixed, the influence of a noise change due to a charging environment change is large. Therefore, it is desirable to determine a threshold value in consideration of the noise level in each charging. For example, an average value of the count numbers within a predetermined time after the start of charging is calculated as the noise level, and the sum of the average value and a predetermined value is used as the threshold value.

EXAMPLE 2

In this embodiment, an example of a fully charged condition detection which can achieve higher accuracy by removing a noise included in the obtained signal will be described.

An sealed lead acid storage battery, a nickel-cadmium storage battery and a nickel-metal hydride storage battery all of which had a nominal capacity of 6.5 Ah were actually charged at a charging current of 6.5 A in an atmosphere of 25° C. by using the apparatus shown in FIG. 1. As a result, it was recognized that in any of these batteries, pulse vibrations with frequencies in a range of 1 kHz to 500 kHz were generated inside the batteries when the batteries were brought from the last stage of charging to an overcharged condition. At this time, as the sensor 1, a piezoelectric element (manufactured by NF corporation: model No. AE-900S-WB) using lead zirconate titanate ceramic was used.

Therefore, the noise can be eliminated by extracting only signals in a predetermined frequency region from the output signals of the sensor 1.

The generation of the AE signal is basically caused by the generation, burst or absorption of bubbles due to the electrolysis of water. Therefore, it is considered that vibrations of a similar frequency region are caused in other types of secondary batteries using aqueous solutions.

Figure 6:
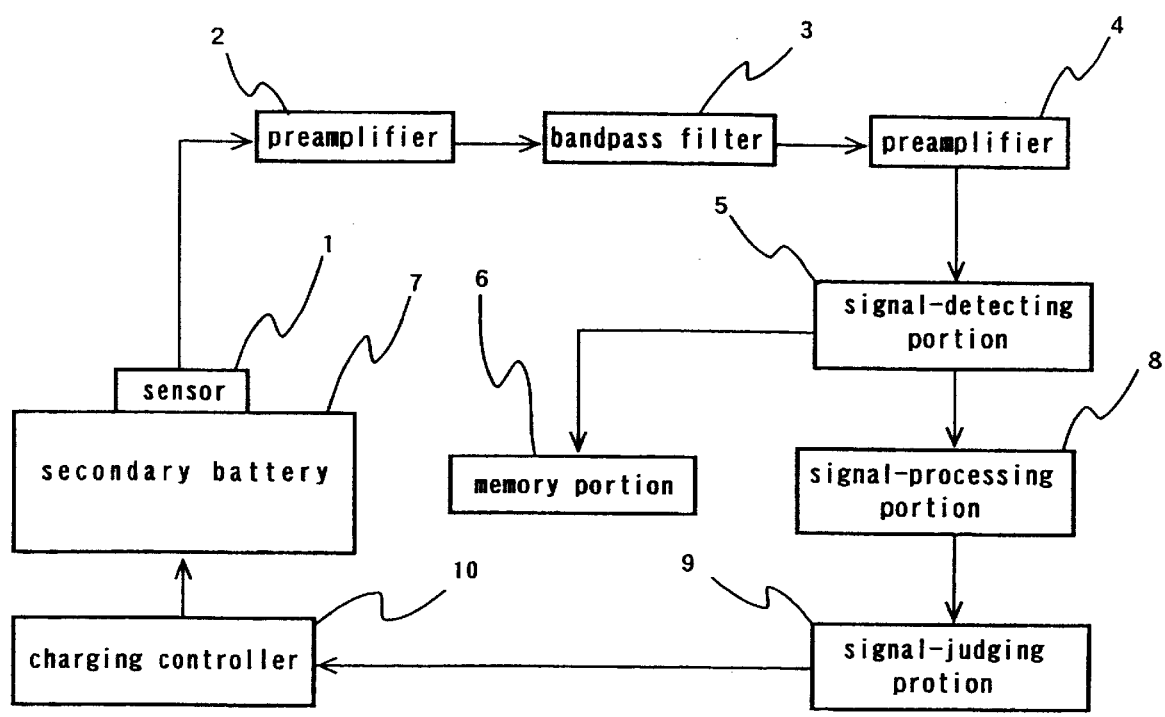
FIG. 6 is a block diagram showing the structure of a battery charger used in another embodiment of the present invention.

A nickel-metal hydride storage battery similar to the above-mentioned one was actually charged by using a battery charger shown in FIG. 6. This battery charger is similar to the one used in the Example 1 and to which a bandpass filter 3 and a preamplifier 4 are added. For this battery charger, a tester 11 (manufactured by NF Corporation: model No. 9501) having the bandpass filter 3, the preamplifier 4 and the signal-detecting portion 5 that are integrated with one another was used.

The output signal of the sensor 1 is amplified by the preamplifier 2 and is then input to the bandpass filter 3. The bandpass filter 3 permits only components having frequencies of 1 kHz to 500 kHz to pass therethrough. The noise-removed signal from the bandpass filter 3 is further amplified by the preamplifier 4, then input to the signal-detecting portion 5.

Figure 7A:
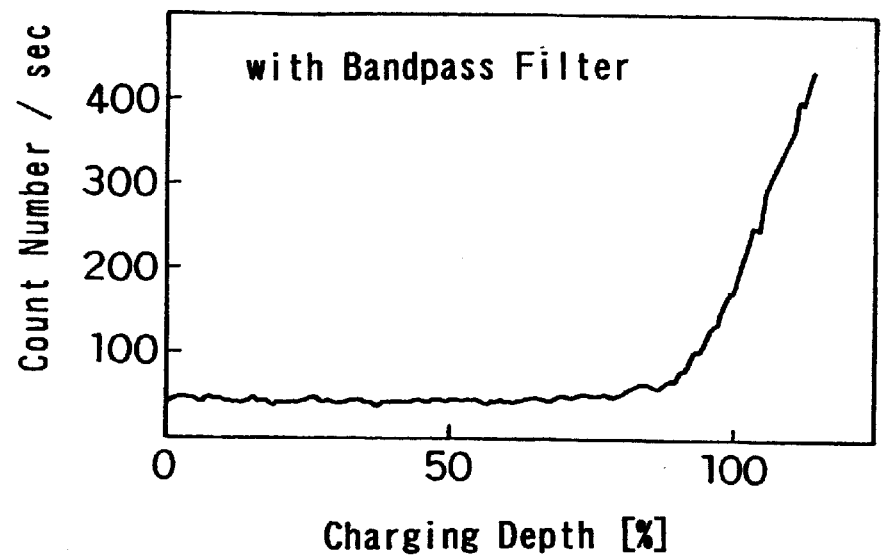
FIG. 7A is a characteristic diagram showing a behavior of the count number of the pulse vibrations calculated and observed based on the output signal of a piezoelectric element having been filtered by a bandpass filter in the battery charger.
Figure 7B:
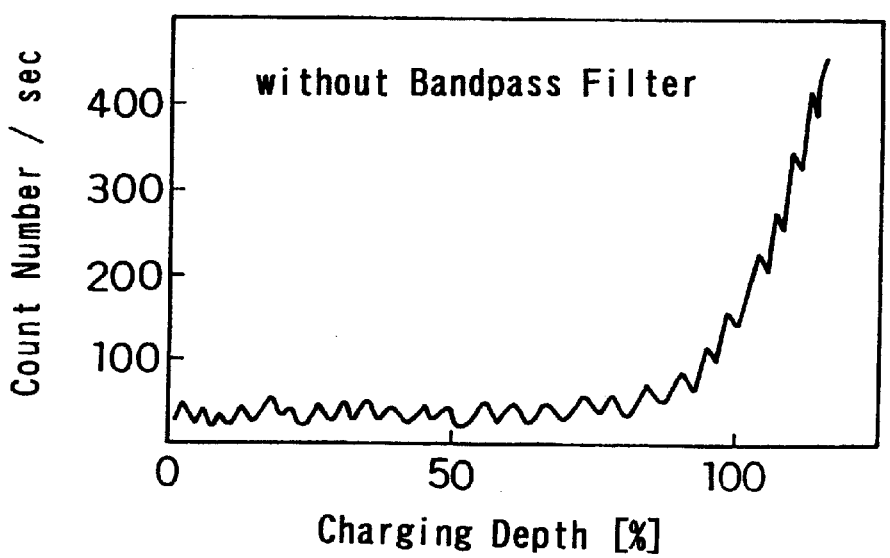
FIG. 7B is a characteristic diagram showing a behavior of the count number observed by the battery charger not using a bandpass filter.

FIG. 7A shows the count number when the output signal of the sensor 1 was filtered by the bandpass filter 3 by using the battery charger of this embodiment. FIG. 7B shows the count number observed in the battery charger of Example 1, that is, the count number detected by the signal-detecting portion 5 when the secondary battery 7 was charged without the bandpass filter 3. As is apparent from comparison between these count numbers, the noise included in the signal can be removed by using the bandpass filter 3.

The fully charged condition can be detected based on the intensity of the vibrations for a predetermined time measured by using an RSM circuit or the like as well as based on the count number of the pulse vibrations detected for a predetermined time as described above. For example, the fully charged condition can be detected with accuracy by comparing the intensity (the value obtained by integrating the amplitude with respect to the time) of the pulse vibrations detected during charging with the threshold value by using an apparatus similar to the above-described one. It is particularly preferable to set the integration time to one second or longer because the influence of the noise mixed in the signal can be reduced. Moreover, the reliability is further improved by leveling the signal.

Provision of a correlation with the charging rate is effective to determine with higher accuracy that the battery is fully charged.

The fully charged condition detection may be performed by calculating the count number at regular intervals and using the time integration value, that is, the rate of increase in the count number. Since the integration value is largely affected by noise, it is necessary to level the data in advance to perform integration. Preferably, the count number calculation interval is one second or longer.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for detecting a fully charged condition of a secondary battery, the method comprising the steps of:

detecting pulse vibrations generated inside said secondary battery;

determining a value of said pulse vibrations; and determining said battery to be in a fully charged condition when the value of said pulse vibrations reaches a predetermined value.

2. The method for detecting a fully charged condition of a secondary battery in accordance with claim 1, wherein said value is a count number of said pulse vibrations within a predetermined time.

3. The method for detecting a fully charged condition of a secondary battery in accordance with claim 1, wherein said value is an average value of intensities of said pulse vibrations within a predetermined time.

4. The method for detecting a fully charged condition of a secondary battery in accordance with claim 1, wherein, of said pulse vibrations, components having frequencies in a range of 1 kHz to 500 kHz are extracted and evaluated with higher priority.

5. The method for detecting a fully charged condition of a secondary battery in accordance with claim 4, wherein said pulse vibrations are detected by using a piezoelectric element whose resonance frequency is included in the frequency region.

6. The method for detecting a fully charged condition of a secondary battery in accordance with claim 4, wherein, of an electric signal obtained by detecting said pulse vibrations, components in the frequency region are extracted by using a bandpass filter.

7. A detector for detecting a fully charged condition of a secondary battery, comprising:

a pulse vibration detecting unit for detecting a characteristic value of pulse vibrations generated inside a secondary battery being charged; and a fully charged condition determining unit for determining the fully charged condition of said secondary battery by comparing said characteristic value with a preset value.

8. The detector for detecting a fully charged condition of a secondary battery in accordance with claim 7, wherein said characteristic value is a count number of said pulse vibrations within a predetermined time.

9. The detector for detecting a fully charged condition of a secondary battery in accordance with claim 7, wherein said characteristic value is an average value of intensities of said pulse vibrations within a predetermined time.

10. The detector for detecting a fully charged condition of a secondary battery in accordance with claim 7, wherein said pulse vibration detecting unit comprises means for extracting, of said pulse vibrations, components having frequencies in a range of 1 kHz to 500 kHz with priority.

11. The detector for detecting a fully charged condition of a secondary battery in accordance with claim 10, wherein said pulse vibration detecting unit comprises a piezoelectric element.

12. The detector for detecting a fully charged condition of a secondary battery in accordance with claim 10, wherein a resonance frequency of said piezoelectric element is included in the frequency region.

13. The detector for detecting a fully charged condition of a secondary battery in accordance with claim 11, wherein said pulse vibration detecting unit has a bandpass filter for filtering and extracting said components of the pulse vibration.

* * * * *